US009436463B2

(12) United States Patent
Sass et al.

(10) Patent No.: US 9,436,463 B2
(45) Date of Patent: Sep. 6, 2016

(54) SYSTEM AND METHOD FOR CHECKING OPEN SOURCE USAGE

(71) Applicant: WhiteSource Ltd., Bnei-Brak (IL)

(72) Inventors: Rami Sass, Tel-Aviv (IL); Ron Rymon, Hertzeliya (IL); Tom Shapira, Zofit (IL)

(73) Assignee: Whitesource Ltd., Bnei-Brak (IL)

( * ) Notice: Subject to any disclaimer, the term of this patent is extended or adjusted under 35 U.S.C. 154(b) by 0 days.

(21) Appl. No.: 14/594,384

(22) Filed: Jan. 12, 2015

(65) Prior Publication Data

US 2016/0202972 A1 Jul. 14, 2016

(51) Int. Cl.
G06F 9/44 (2006.01)
G06F 21/10 (2013.01)

(52) U.S. Cl.
CPC .............. *G06F 8/751* (2013.01); *G06F 21/10* (2013.01); *G06F 21/105* (2013.01)

(58) Field of Classification Search
CPC ................... G06F 8/751; G06F 21/10–21/105
See application file for complete search history.

(56) References Cited

U.S. PATENT DOCUMENTS

| | | | | |
|---|---|---|---|---|
| 7,503,035 B2* | 3/2009 | Zeidman | ................... | G06F 8/71 434/118 |
| 7,552,093 B2* | 6/2009 | Levin | ..................... | G06Q 10/10 705/51 |
| 7,568,109 B2* | 7/2009 | Powell, Jr. | ................ | G06F 8/36 713/187 |
| 7,823,127 B2* | 10/2010 | Zeidman | ................... | G06F 8/73 434/367 |
| 7,870,075 B1* | 1/2011 | Sabet | .............................. | 705/52 |
| 7,934,197 B2* | 4/2011 | Thorell | ........................ | 717/120 |
| 8,010,803 B2* | 8/2011 | Pedersen | ............... | G06F 21/602 713/153 |
| 8,307,351 B2* | 11/2012 | Weigert | ........................ | 717/141 |
| 8,479,161 B2* | 7/2013 | Weigert | ........................ | 717/124 |
| 8,572,093 B2* | 10/2013 | Weigert et al. | ............... | 707/748 |
| 8,589,306 B1* | 11/2013 | Morriss et al. | ................. | 705/59 |
| 8,635,162 B2* | 1/2014 | Burkhart et al. | ............... | 705/59 |
| 8,838,964 B2* | 9/2014 | Gregorovic et al. | ......... | 713/165 |
| 8,875,301 B2* | 10/2014 | Lori | ................ | 726/26 |
| 9,003,366 B2* | 4/2015 | Zeidman | ................... | G06F 8/73 717/123 |
| 2005/0125358 A1* | 6/2005 | Levin et al. | ..................... | 705/59 |
| 2005/0216898 A1* | 9/2005 | Powell et al. | ................. | 717/141 |
| 2007/0271190 A1* | 11/2007 | Foster | ............................. | 705/59 |
| 2008/0091677 A1* | 4/2008 | Pedersen et al. | ................. | 707/6 |
| 2008/0091938 A1* | 4/2008 | Pedersen et al. | ............. | 713/153 |
| 2008/0154965 A1* | 6/2008 | Pedersen | .................... | G06F 8/36 |
| 2009/0089754 A1* | 4/2009 | Zeidman | ....................... | 717/123 |

(Continued)

OTHER PUBLICATIONS

Ahtiainen, Aleksi, Sami Surakka, and Mikko Rahikainen. "Plaggie: GNU-licensed source code plagiarism detection engine for Java exercises." Proceedings of the 6th Baltic Sea conference on Computing education research: Koli Calling 2006. ACM, 2006.*

Cosma, Georgina, and Mike Joy. "Towards a definition of source-code plagiarism." IEEE Transactions on Education 51.2 (2008): 195-200.*

(Continued)

*Primary Examiner* — Matthew Brophy

(74) *Attorney, Agent, or Firm* — Roach Brown McCarthy & Gruber, P.C.; Kevin D. McCarthy

(57) ABSTRACT

A method, system and computer program product, the method comprising: receiving a characteristic of a source code entity to be checked; comparing the characteristic of the source code entity to be checked to characteristics stored in a repository; and subject to determining with at least a first probability that the characteristic of the source code entity to be checked is found in the repository, providing an indication of an open source library associated with the characteristic, wherein the source code entity to be checked is not received with the characteristic.

21 Claims, 3 Drawing Sheets

(56) References Cited

U.S. PATENT DOCUMENTS

| | | | |
|---|---|---|---|
| 2010/0325614 A1* | 12/2010 | Zeidman | G06F 8/73 717/123 |
| 2012/0240096 A1* | 9/2012 | Sass | 717/101 |
| 2013/0055235 A1* | 2/2013 | Eska | G06F 8/751 717/173 |
| 2013/0254744 A1* | 9/2013 | Sahoo et al. | 717/123 |

OTHER PUBLICATIONS

Liu, Chao, et al. "GPLAG: detection of software plagiarism by program dependence graph analysis." Proceedings of the 12th ACM SIGKDD international conference on Knowledge discovery and data mining. ACM, 2006.*

Monden, Akito, et al. "Guilty or not guilty: Using clone metrics to determine open source licensing violations." IEEE software 28.2 (2011): 42.*

* cited by examiner

SYSTEM AND METHOD FOR CHECKING OPEN SOURCE USAGE

TECHNICAL FIELD

The present disclosure relates to open source in general, and to a system and apparatus for checking whether open source code is present in user's code base, in particular.

BACKGROUND

Open source relates to computer source code that is publicly available and may be freely accessed and used by programmers developing code. Open source may be provided as binary files or libraries to be linked with a user's project, as code files to be compiled with a user's project, as code snippets to be added and optionally edited by a user as part of a file, any other format, or any combination thereof.

Open source may be used for a multiplicity of reasons, such as but not limited to: saving programming and debugging time and effort by obtaining a functional verified unit; porting or programming code to an environment in which the user has insufficient experience or knowledge; adding generic options such as graphic support, printing, or the like, or others. The ease of obtaining such code on the Internet has greatly increased the popularity of its usage.

Despite the many advantages, source code may also carry hazards. One such danger may relate to the need to trust code received from an external source. Such code may contain bugs, time or space inefficiencies, or even viruses, Trojan horses, or the like. Such threat may be overcome by using only open source provided by known and trusted origin.

Another problem in using open source relates to the licenses which may be associated with any open source unit. Any such license may incur specific limitations or requirements on a user or a user's project developed using the open source.

Some licenses may require copyright and notification of the license. Others may require that if a user modified the used open source, for example fixed a bug, the user shares the modified version with other users in the same manner as the original source code was shared. Further licenses may require sharing the users' code developed with the open source with other users. The extent for which sharing is required may vary between files linked with files containing open source, and the whole user project. Further requirements may even have implications on the user's clients which may use the project developed with open source.

Open source may also pose legal limitations, such as limitations on filing patent applications associated with material from the open source, the inability to sue the open source developer if it does not meet the expectations, or the like.

Once the requirements are known, a user may decide whether it is acceptable for him or her to comply with the requirements, take the risks, and use the open source. However, some users do not pay attention to the license and its terms or intentionally ignore them and do not comply with the requirements. In further cases, a user who incorporated open source into a project may have left the company without taking the appropriate action and without notifying other team members, thus leaving the company in a non-complying and unaware situation. Many companies are thus unaware that their product comprises open source while they do not comply with the terms. In some cases, such compliance may not even be an option for the company.

Such ignoring may have severe consequences for the user and the organization. For example, company's code may undergo due diligence in which the situation may be detected and harm the company's value or options. In other situations, a company may wish to form business relations with another company that demands the first company to confirm it does not use open source, or does not use open source which is subject to specific licenses.

In other situations, the non-compliance may be detected by a third party that may demand the company to comply with the license. Such third party may be a competitor, a non-profit organization, a governmental organization, an open source developer, an open source license enforcement organization, or the like. For example, such third party may demand that the company exposes its code, which many companies cannot agree to since the code contains highly confidential material. If the company is not willing to comply with the license terms, it may be required to stop using the open source, which may mean re-writing parts of a product which may even be marketed, thus also causing great harm to the company. Such third party may also require the company to pay substantial fines, or the like.

Thus, it may be required to identify whether a programming project contains open source. If so, it may further be required to identify which open source files, libraries or code snippets are used, and optionally under which license, such that a company using open source may decide whether it wishes to take the risks and comply with the terms, rewrite the code or otherwise resolve the situation.

BRIEF SUMMARY

One exemplary embodiment of the disclosed subject matter is a computer-implemented method comprising: receiving a characteristic of a source code entity to be checked; comparing the characteristic of the source code entity to be checked to characteristics stored in a repository; and subject to determining with at least a first probability that the characteristic of the source code entity to be checked is found in the repository, providing an indication of an open source library associated with the characteristic, wherein the source code entity to be checked is not received with the characteristic. The method may further comprise determining a characteristic of an open source code entity associated with an open source project; and storing the characteristic and an identifier of the open source code entity in the repository. Within the method, the identifier optionally comprises a name of the open source project. Within the method, the identifier optionally comprises an item selected from the group consisting of: a license associated with the open source project, a vulnerability, a bug, a quality issue, a trend report, a replacement, and information related to other users that use the open source project. Within the method, the characteristic of the source code entity to be checked is optionally a hash value assigned to the source code. Within the method, the hash value is optionally obtained by performing SHA-1 hash function upon the source code. Within the method, the characteristic of the source code entity to be checked is optionally a sequence of keywords or keyword symbols extracted from the source code entity. Within the method, the characteristic of the source code entity to be checked is optionally a value computed based on a sequence of keywords or keyword symbols extracted from the source code entity. Within the method, the source code entity to be checked is optionally a file. Within the method, the source code entity to be checked is optionally a portion of a file. Within the method, the source code entity to be checked optionally comprises two portions of a file. Within the method, the source code entity to be checked is optionally a predetermined number of code lines extracted from a file. The method may further comprise determining the characteristic of the source code entity to be checked. The method may further comprise removing non-functional parts of the source code entity prior to determining the characteristic. Within the method, determining with at least the first probability that the characteristic of the source code entity to be checked is found in the repository is optionally based on a second characteristic of a second source code entity found in the repository with at least a second probability.

Another exemplary embodiment of the disclosed subject matter is a system for determining open source usage, comprising: a processor; a communication component for receiving a characteristic of source code entity to be checked; a repository comprising a multiplicity of source code entity characteristics and an identifier of an open source project associated with each source code entity characteristic; a comparison component for comparing the characteristic of the source code entity to be checked with the multiplicity of source code entity characteristics; and a user interface module or communication module for providing the identifier of the open source project associated with a characteristic identical to the characteristic of the source code entity to be checked. The system may further comprise a characteristic determination component for determining the characteristic of source code entity. Within the system, the characteristic of the source code entity to be checked is optionally a hash value assigned to the source code. Within the system, the characteristic of the source code entity to be checked is optionally a sequence of keywords or keyword symbols extracted from the source code entity.

Yet another exemplary embodiment of the disclosed subject matter is a computer program product comprising a computer readable storage medium retaining program instructions, which program instructions when read by a processor, cause the processor to perform a method comprising: receiving a characteristic of a source code entity to be checked; comparing the characteristic of the source code entity to be checked to characteristics stored in a repository; and subject to determining with at least a first probability that the characteristic of the source code entity to be checked is found in the repository, providing an indication of an open source library associated with the characteristic, wherein the source code entity to be checked is not received with the characteristic.

THE BRIEF DESCRIPTION OF THE SEVERAL VIEWS OF THE DRAWINGS

The present disclosed subject matter will be understood and appreciated more fully from the following detailed description taken in conjunction with the drawings in which corresponding or like numerals or characters indicate corresponding or like components. Unless indicated otherwise, the drawings provide exemplary embodiments or aspects of the disclosure and do not limit the scope of the disclosure. In the drawings.

DETAILED DESCRIPTION

Figure 1:
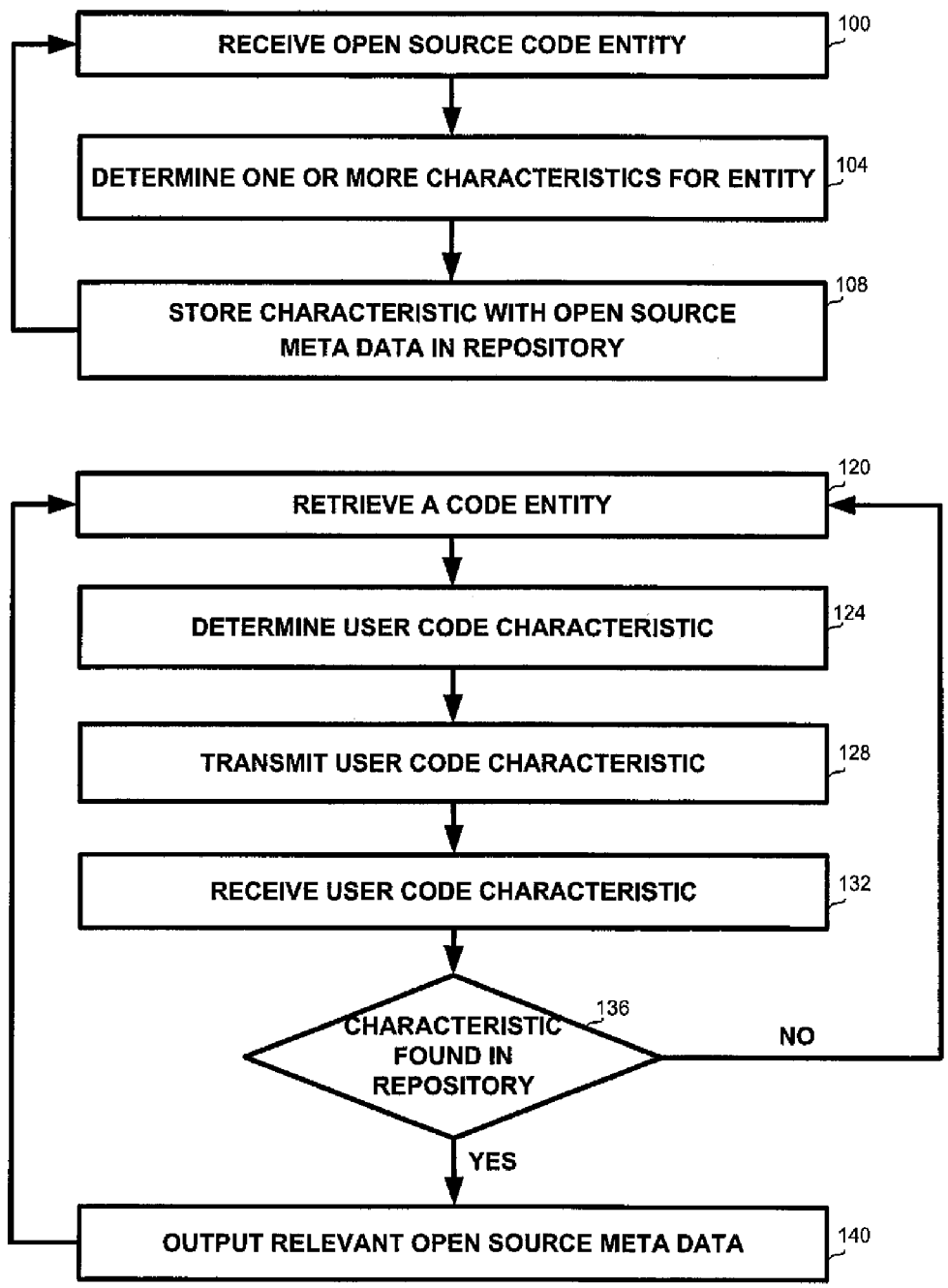
FIG. 1 shows a flowchart diagram of a method for determining whether a user's code contains open source, in accordance with some exemplary embodiments of the subject matter.

One technical problem dealt with by the disclosed subject matter is the need to detect whether a user's code comprises open source code. Open source may be provided as one or more binary libraries, compiled files, one or more file hierarchies of source code, or the like. Open source may be found in user's code as one or more binary files, one or more source files, or one or more code snippets within source files.

Another technical problem dealt with by the disclosed subject matter is the need to identify which open source project and which version thereof the source code found in the user's project belongs to.

Yet another technical problem dealt with by the disclosed subject matter is the need to identify which license the source code may be associated with, or additional data related to used open source projects. An original source code project may be associated with a first license. A user may then take the project, change one or more files, add a notice that the amended files are subject to a second license, and make the amended project publicly available. A second user may then use the amended project, which is associated with the first and the second licenses. Additional data related to used open source projects which may also be required may include vulnerabilities, bugs, quality issues, or the like. Additional data related to the open source project may include reports on trends, replacements, what other users use the open source project for, or the like.

Yet another technical problem relates to making such determination without copying the user's project to a location external to the user's network. Such copying may be against company policy, may comprise copyright infringement, or may expose the copied code to all kinds of security vulnerabilities, and is thus undesired. In addition, such copying may unnecessarily take up significant disk space and communication volume.

One technical solution comprises a method and system for discovering open source projects, parts of which are being used within source files, e.g., identifying logical entities, such as an open source library from physical parts such as user files or parts thereof. The method and apparatus thus provide for identifying source code associated with open source repository, within another set of source code files, being the user's code.

The open source identification comprises a preparation stage and an investigation stage, wherein the preparation stage is common to all users and creates a common repository, while the investigation stage is performed for each user separately. On the preparation stage, a repository related to known open source projects and their versions is created. Each entry in the repository comprises an identifier of an open source entity, and one or more unique characteristics associated with the entity. The term entity may relate to a code file written in any programming language, but also to parts thereof as detailed below. The unique characteristic, also referred to as signature, may be computed by executing a hash function of the code, wherein the hash function returns a value within a large range. For example, the SHA-1 cryptographic hash function may be used, which returns a 160 bit number. Thus, the repository may comprise for each version of each entity the name and version of the open source project it belongs to, the entity name, its characteristics, the license associated with the open source project, and possibly additional attributes and information related to the open source project, such as vulnerabilities, bugs, quality issues, reports on trends, replacements, what other users use the open source project for.

The characteristics, or signatures may be determined for entities such as a file, or any part thereof, in order to increase resistance to changes in files. For example a file may be analyzed in halves, such that a characteristic is assigned to each half of the file, in predetermine number of lines, for example every 50 lines, to predetermined lines such as every third line, or the like. In further embodiments, logical parts of the file may be analyzed, such as one or more functions, object descriptions in object oriented programming, or the like. It will be appreciated that each source file may be analyzed in a multiplicity of divisions, such as the whole file, every predetermined number of lines, every predetermined ¼ of the file, the first and last 50 lines of the file, every tenth line, or the like.

The entity name as stored in the repository may indicate the entity and may thus be the file name, the file name accompanied by a range of rows, a file name accompanied by an identifier such as "first half", "middle third", "first 50 rows", a file name accompanied by a function or method name, or the like. Any time a new open source project or a new version of an existing project comes out, the repository or parts thereof may be updated with information related to the entities contained in the project.

On the investigation stage, the source code of a particular user may be examined. Depending on the requirements, in some cases all source code of a particular user, such as a company, may be examined, in other cases only code that is part of one or more products may be examined, in further cases only code related to a particular project may be examined, or the like.

During examination, each source file is processed by the same function used to create the common repository. The function may be executed on the user's system, such that the user's code does not have to be sent anywhere outside the user's network, thus avoiding company policy violation, copyright issues, vulnerability to security hazards, reducing communication and storage volume, and the like.

Once the characteristics associated with each file are received, they may be compared to the hash values stored in the common repository. If the hash values of one or more of the user's entities are found in the common repository, it is assumed that the associated open source entities are present in the user's source. The open source projects to which the entities having the same characteristics belong, and their respective versions may then be identified.

The characteristics for the user code may be determined in the same manner as for the open source project processed during the preparation step. Thus, for example, if a user changed the first five lines of an 80 line file, the second half of the file and hence its characteristics will remain unchanged. If the user adds 5 lines at the bottom of the file, although the first half of the file changes (since the file length changes), the first 50 lines will remain unchanged, and the like. Thus, dividing and processing a file in a multiplicity of ways may increase the endurance of the method and apparatus to changes introduced to the file, including length or content changes.

Since the hash function is selected such that values in a very large range are assigned to entities, uniqueness or substantial-uniqueness of the hash value is guaranteed. Substantial-uniqueness may relate to a situation in which even if one entity has the same hash value as a different entity, this is highly unlikely to happen to two or more entities found on the user's source. Since most open source projects comprise more than one code entities, if code from an open source project is found on the user's computer, there is significant probability that multiple entities will be detected.

It will be appreciated that even if a user introduces changes to an open source project, the user is unlikely to introduce changes to all entities in the project, but rather to some of them. Thus, it is likely that some of the entities are unchanged and will have the same hash value as stored in the repository in association with the open source project. Thus, the used open source project may be identified even if only a small number of files has been left unchanged.

In some embodiments, comments contained the entity may be scanned for determining whether they contain reference to a known license. If such comment is found, the referenced license may also be transmitted, compared to the license associated with the entity in the common repository, and if there is a mismatch the license may be reported.

In order to increase the robustness to code changes, some modifications may be made to the way the hash function is used.

First, all comments, redundant space characters, new lines and other non-functional parts may be removed from the source code prior to determining the hash value, both when processing the open source projects while preparing the repository, and when examining user code entities. It will be appreciated that comment removal may be done after the comments have been scanned for license references as described above.

Another modification may relate to determining a separate hash value for separate fragments of files, as described above. Then, the relevant Then during investigation stage, a hash value for may then be determined respective parts of the user's code and compared to the stored values. If one or more matches are found, it is assumed that the user's code contains the code from the respective open source project.

Another embodiments relates to identifying code snippets, which are literally or conceptually copied from known open source projects.

For each language, a collection of known keywords is created. Then when a code entity is scanned, a list of the keywords appearing in the file or part thereof is created according to the order in which they appear in the code entity. Entities in known open source projects may be processed and the resulting keyword sequences may be stored in a common repository as descried above. Once the common repository is available, the same processing may be performed for user's code entities such as files or parts thereof. The keyword sequences extracted from the user's code entities may then be transmitted, without having to transmit the user's code. The sequences may then be compared to the sequences stored in the common repository.

It will be appreciated that comparing may relate to finding sub-sequences appearing in any of the sequences stored in the common repositories and in any of the user's files. For example, common subsequences of at least a specific length, which may be predetermined or selected dynamically, may be searched for. It will be appreciated that common sequences or subsequences may also be searched for with some overlaps. For example, a sequence generated upon lines 0-100 of a file, or a characteristic generated upon the sequence may be searched in the repository, and the sequence or characteristics based on lines 25-125 of the file may be searched as well. Such modification may increase robustness against changes introduced to the file, including changes to the length of the file, addition of code or keywords, or the like.

The entity name may represent the entity and may thus be a file name, a file name accompanied by rows indication, a file name accompanied by an identifier such as "first half", "middle third", first 50 lines, a file name accompanied by a function or method name, or the like. Any time a new open source project or a new version of an existing project comes out, the repository may be updated with information related to the entities contained in the project.

If a sequence or a subsequence appearing in a user's code entity is found in the repository, an indication may be provided that the user's code contains or is highly similar to code contained in one of the open source projects contained in the repository.

One technical effect of utilizing the disclosed subject matter is the provisioning of a method and apparatus for determining the presence of open source code in a user's code, and identifying the open source. The method and apparatus overcome difficulties such as modifications introduced to the open source by the user, which may make it harder to recognize the open source within the user's code. In the keyword sequence embodiment, since the language keywords are predetermined, the disclosed subject matter ignores user-changeable tokens such as names and values and focuses on the essence of the code.

Another technical effect of utilizing the disclosed subject matter is the determination of open source code presence in a user's code in a non-intrusive manner and without having to transmit the code out of the user's network, by transmitting only characteristics of the code, thus avoiding copyright infringement and security hazards, and promoting efficiency since redundant storage, communication volume and intensive comparisons are eliminated.

Referring now to FIG. 1 showing a flowchart diagram of a method for determining whether a user's code contains open source.

On step 100, an open source entity is received, such as a file extracted from a known open source library, or a part thereof.

On step 104, one or more characteristics may be determined for the entity. Exemplary characteristics may include but are not limited to: a result of a hash function such as SHA-1 function applied to the entity, for example a file, a part of the a such as the first or another specific part of a file, specific range of lines from a file, a function, a method, a file library, a directory, or the like.

The characteristic of the entity may be determined after the entity has undergone some preprocessing, for example comment removal, space or new line character removal, or the like.

In some embodiments, the characteristic may include a list of keywords appearing in the file, wherein the keywords are specific for the programming language in which the file is written. It will be appreciated that keyword symbols, such as numeric values, may be used instead of the keywords. Thus, each file, or part thereof such as a predetermine number of lines, a predetermined fraction of the file, a row collection, a function, a method, or the like may be represented as a sequence of keywords. A characteristic, such as a hash value may be associated with the keyword sequence. It will be appreciated that user-specific contents and in particular names of variables, constants, functions or the like are not processed. According to the specific implementation, variable definitions may or may not be processed.

In some embodiments, the resulting sequence may be coded in a manner that provides for numerical or another easy comparison. In some embodiments, different keywords or keyword sequences may be assigned different weights, for example very common structures such as "for" loop may be assigned lower weight than "while" loop which is sometimes used less often. In some embodiments, the weight assignment may be dynamic and be based on the words' frequencies in the specific document or project.

Considering the keywords enables for ignoring different names used in code, such as function or method names, variable names, or the like.

It will be appreciated that in any of the embodiments, some files, for example files smaller than predetermined size, may be ignored and not be processed, due to the high chance of false alarms.

On step 108, the characteristic and an identifier of the entity, such as the file library or the file name, may be stored in the repository. Open source meta data related to the file may also be stored, including for example the open source project name, the project version, the license associated with the project, or other data as detailed above. The entity itself may or may not be stored.

In some embodiments, the characteristics may be stored in a manner that enables fast search, for example in a sorted manner. Since the repository is created offline and updated as new open source projects are added, there is no particular importance to the efficiency of the repository creation, but it may be beneficial to perform searching through a multiplicity of entries, as is done when checking user code, in an efficient manner.

Steps 100, 104 and 108 may be performed once for each code entity, and the results may be stored in a common repository, hosted for example in a cloud.

Steps 100, 104 and 108 may be repeated for each entity in each known open source project. When a new project becomes known, its files may be processed as detailed above, and it may be added to the repository.

Steps 120 and further as detailed below may be performed for each entity such as a file or part thereof in a user's environment, for example a user's project, a user's server, or the like. The steps may be performed by the user wishing to assess his or her open source usage, or by any third party such as a business partner, a rival executing a court order, a non-profit organization, a governmental organization, or the like.

On step 120, the user's code entities, such as files or parts thereof are iterated and entities are retrieved.

On step 124, one or more characteristics are determined for the user's entity, as detailed in association with step 104 above. It will be appreciated that the same characteristic extracted from the open source project entities is to be extracted from the user code. Alternatively, a different characteristic may be extracted if a mapping between the two types of characteristics can be determined. In some embodiments, information related to copyright or licensing may be extracted from the user's entity, for example from comments within the file.

In some embodiments, the characteristic may be a keyword sequence extracted from the entity as detailed above. It will be appreciated that similarly to the hash value implementation, using such sequences avoids the transmission of user proprietary information since only the resulting sequences, or characteristics thereof are transmitted.

On step 128, the user code characteristic is transmitted from the user's network to a location in which it may be compared to the repository, such as the cloud or a computing platform having access to the cloud, to a server being in communication with the repository, or the like. In some embodiments, the file or entity name, library or another identifier may also be transmitted. In some embodiments, license information extracted from the entity may also be transmitted.

On step 132, the user code entity characteristic may be received, for example by a server. In some embodiments, the repository may be available locally to the user's computing environment, in which case transmitting and receiving the characteristics or other details may be omitted.

On step 136, it may be determined whether the characteristic is found in the repository, for example by comparing the received user code entity characteristic to the characteristics stored in the repository. If the characteristic is found in the repository, an indication may be provided that the open source project associated with the entry in the repository having the same characteristic is used by the user. If the user entity name, or license information extracted from the entity are available, they may be indicated as well.

If the characteristic is a hash value, then comparison may relate to numerical comparison. If the keyword sequence implementation is used, then comparing may relate to searching for the exact sequence or to a common subsequence, in order to recognize, for example, the presence of a code snippet essentially copied from an open source project in a user file. In some embodiments, substantial similarity, or similarity exceeding a predetermined threshold may be required rather than absolute identity, in order to be able to recognize open source even in cases where the user introduced modifications to the code, such as deleting lines, adding lines, changing names, or the like.

It will be appreciated that the sizes of the processed units, for example the files, file fractions, predetermined number of lines, etc. may affect the results as well as the checking speed. Smaller units provide for higher recall rate but also higher false alarm rate and lower precision, in which user original code is identified as belonging to an open source project. Using larger units increases the precision and reduces the false alarm rate but also reduces the recall rate. The size determination thus depends on the goal: whether it is crucial to the person checking the user's code to identify any possible open source usage even if the user has to review a significant number of false alarms, or are time and labor also an issue, and the person is willing to risk missing some open source usage. The sizes may further depend on the specific subject matter to be examined, for example the number and sizes, the total size of the files to be analyzed, its complexity, urgency, or the like.

In some embodiments, a coarse examination with large entity sizes may be performed. If one or more findings suggest the usage of open source projects, a finer examination may be performed with smaller unit sizes.

It will be appreciated that the determination whether an entity appears in the open source project may be dependent on the status of other entities. For example, if one or more entities are determined with high probability to contain code from a particular open source project, then if there is a low probability that another entity contains open source from the same project, it may be assumed that the entity indeed contains code from the open source.

It will also be appreciated that an entity may be determined or suspected to belonging to two or more open source projects. In such cases, any of the projects or both may be displayed and the user may be prompted to further check the situation.

If the characteristic is indeed found in the repository, then on step 140 the relevant open source meta data, such as the open source project, its version, the associated license, or the like, are used by the user. If the user's file name or another identifier is available, it may be reported as well. The associated license may relate to the one or more licenses associated with the open source project. If a different license is associated with one or more files used by the user, this license may be indicated as well.

In some embodiments, and optionally depending on the open source project size, positive identification of the usage of an open source project may be reported only if at least a predetermined number of user entities are identified, for example at least three user files have characteristics identical to characteristics stored in the repository. In some embodiments, possible identifications having lower certainty may be presented to a user, such that the user may determine whether or not to continue checking.

Figure 2:
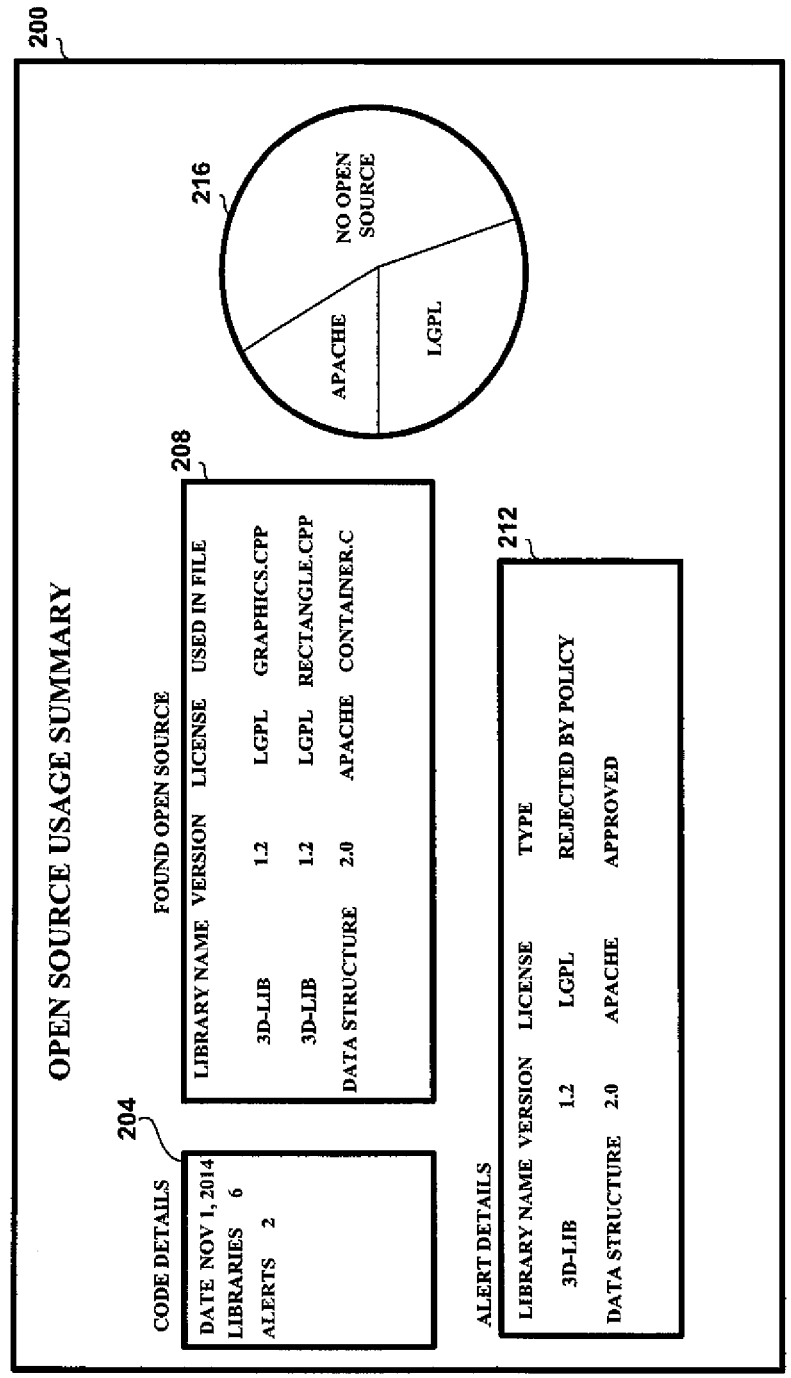
FIG. 2 shows an illustration of an exemplary user interface displaying a summary of the results of detecting open source in a user's project, in accordance with some exemplary embodiments of the subject matter.

Referring now to FIG. 2, showing an illustration of an exemplary user interface displaying a summary of the results of detecting open source in a user's project.

The user interface, generally referenced 200 may comprise pane 204 providing summary and details about the user's code details, such as project date, number of libraries, and total number of open source alerts.

Pane 208 shows details of found open source usage. For example, pane 208 lists the open source projects used, such as 3D-LIB, the open source project version, the license associated with the open source project, and in which user entity the open source code was found. Pane 208 may also display the names of licenses mentioned in the code, for example in comments. If the open source usage is detected in a part of the file, for example the top half of the file, this may also be displayed.

It will be appreciated that if the name of the user's entity is not transmitted with the characteristics, for example for security reasons, then any other identifier of the file may be displayed. In some cases, if it is only required to know whether open source is used or not, then such identifier may be omitted. However, if the name is provided, it may be displayed to help the user locate the file or part thereof.

Pane 212 may provide further details of the open source project found to be used, such as its version, license, and a notice related to the usage of the project in the user's organization, for example approved, rejected, or the like.

Pane 216 may provide graphic representation of the results, for example a pie chart indicating the percentage of the user's entities in which open source was not used, and the percentage in which any found open source project is used.

It will be appreciated that user interface 200 is exemplary only, and many other presentations may be used, including textual, tabloid, or the like, which show different aspects and data related to the open source usage.

In some embodiments, if any open source project or a particular project is found to be used in user's code, an alert may be fired, such as sending a message to a person, starting an audio alarm, or the like. Workflows for further examination or approval may also be implemented.

Figure 3:
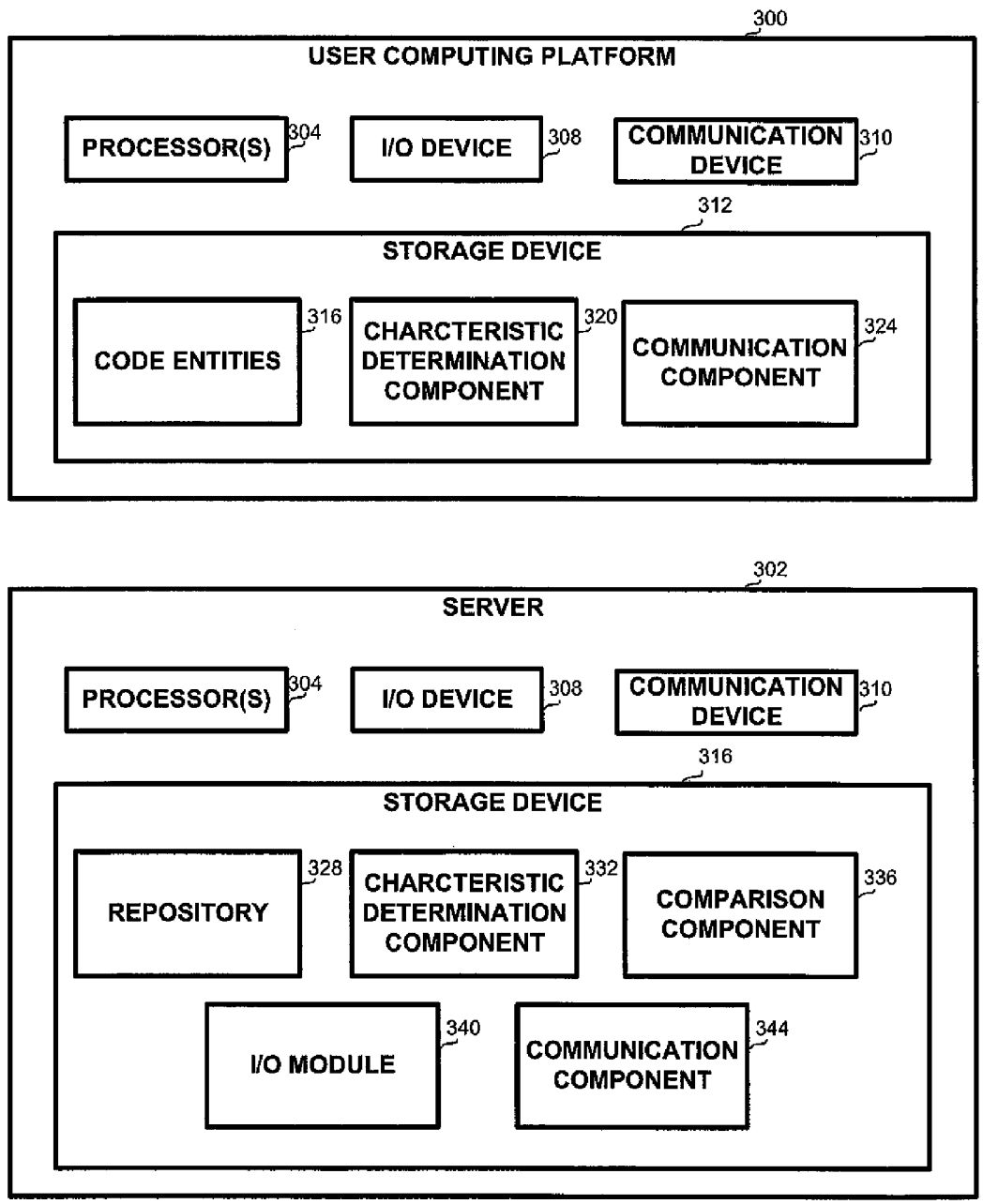
FIG. 3 shows a block diagram of an apparatus for determining whether a user's code contains open source, in accordance with some exemplary embodiments of the disclosed subject matter.

Referring now to FIG. 3, showing a block diagram of an apparatus for determining whether a user's code contains open source.

The apparatus may comprise one or more user computing platforms 300 or one or more servers 302. In some embodiments, user computing platform 300 and server 302 are remote form each other and communicate via any communication channel such as the Internet, Intranet, Local Area Network (LAN), Wide Area Network (WAN), or the like. However in other embodiments, user computing platform 300 and server 302 may be implemented on one device, such as a server.

User computing platform 300 may comprise a processor 304. Processor 304 may be a Central Processing Unit (CPU), a microprocessor, an electronic circuit, an Integrated Circuit (IC) or the like. Processor 304 may be utilized to perform computations required by the apparatus or any of it subcomponents.

In some exemplary embodiments of the disclosed subject matter, user computing device 300 may comprise an Input/Output (I/O) device 308 such as a display, a pointing device, a keyboard, a touch screen, or the like. I/O device 308 may be utilized to provide output to and receive input from a user.

In some exemplary embodiments of the disclosed subject matter, user computing platform 300 may comprise communication device 310 such as a network adaptor. Communication device 310 may enable user computing platform 300 to communicate with other platforms such as server 302.

In some exemplary embodiments, user computing platform 300 may comprise a storage device 312. Storage device 312 may be a hard disk drive, a Flash disk, a Random Access Memory (RAM), a memory chip, or the like. In some exemplary embodiments, storage device 312 may retain program code operative to cause processor 304 to perform acts associated with any of the subcomponents of apparatus 300. The components detailed below may be implemented as one or more sets of interrelated computer instructions, executed for example by processor 304 or by another processor. The components may be arranged as one or more executable files, dynamic libraries, static libraries, methods, functions, services, or the like, programmed in any programming language and under any computing environment.

Storage device 312 may store, or be operatively in communication with another storage device storing one or more code entities 316 of user code, such as source code files or parts thereof, which may be arranged in directories, libraries, projects or any other organizational structure.

Storage device 312 may store characteristic determination component 320 for applying one or more algorithms to a source code entity, and obtaining a characteristic such as a numeric value, a sequence of keywords or identifiers, or the like.

Storage device 312 may store communication component 324 for communicating with other devices, for example transmitting to server 302 the obtained characteristics, optionally with corresponding identifiers of the relevant user code entities. In some embodiments, communication component 324 may be operative to receive open source analysis results from server 302. The results may then be displayed, for example using a user interface module which provides a display such as shown in FIG. 2 above.

Server 302 may comprise a processor 304, I/O device 308, communication device 310 or storage device 316 as described above for user computing platform 300.

Storage device 316 may store or be in communication with another storage device storing repository 328. Repository 328 may comprise identifiers of code entities such as code files or parts thereof of known open source projects, one or more corresponding characteristics for each such entity and optionally additional data such as the open source project version or license associated with each entity or library. In some embodiments, the repository may be arranged so as to provide fast search for characteristics, for determining whether the repository comprises entities having the same or substantially the same characteristics.

Storage device 316 may store characteristic determination component 332 corresponding to characteristic determination component 320, for applying one or more algorithms to a source code entity, and obtaining a characteristic such as a numeric value, a sequence of keywords or identifiers, or the like. Characteristic determination component 332 may operate upon entities associated with known open source projects while creating repository 328.

Storage device 316 may store comparison component 336 for determining whether a given characteristic appears in repository 328. Comparison may relate to numeric comparison of two numbers, to comparing sequences of keywords or other identifiers, to searching for common subsequences within such sequences, or the like. In some embodiments, exact identity may be required, for example when comparing hash values associated with code entities. In other cases, for example in sequence comparison, a similarity metric may be defined, such that two items are considered the same if their similarity metric exceeds a predetermined value.

Storage device 316 may store I/O module 340 for receiving instructions from a user or providing data or results to a user, as described in association with FIG. 2 above. I/O module 340 may also be operative in providing data related to the operation of the apparatus, for example how many code entities were processed, statistics related to detected open source projects, or the like.

Storage device 316 may store communication component 344 for receiving information from other devices such as user computing platform 300 comprising for example the obtained characteristics, optionally with corresponding identifiers of the relevant user code entity. In some embodiments, communication component 324 may be operative to transmit open source analysis results to another device, such as but not limited to user computing platform 300.

Thus, subject to comparison component 336 detecting an entry in the repository for which the characteristic is the same as the provided characteristic of the entity to be checked, the open source project, its version, the associated license or additional details may be displayed using I/O module 340 or communicated, for example to user computing platform 300 or to another destination, using communication component 344 and communication device 310.

It will be appreciated that the disclosure is also operative in identifying cases in which the user's code contains code parts from two or more open source projects.

It will be appreciated that the disclosure is not limited to identifying open source usage, but may be applied to identifying any type of data from an origin within a repository. For example, the disclosure may be used for identifying copyright-protected material, printed circuits, commercial software, literary creations, images, or the like.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A computer-implemented method comprising:
   receiving a first characteristic of a first source code entity to be checked and a second characteristic of a second source code entity to be checked;
   comparing the first characteristic to characteristics stored in a repository representing an open source library;
   comparing the second characteristic to the characteristics stored in the repository;
   based on comparing the first characteristic to the characteristics stored in the repository, determining a first probability indicating that the first source code entity contains code from the open source library;
   based on comparing the second characteristic to the characteristics stored in the repository, determining a second probability lower than the first probability, wherein the second probability indicates that the second source code entity does not contain code from the open source library;

determining, due to the first probability indicating that the first source code entity contains code from the open source library, that the second source code entity also contains code from the open source library; and providing an indication of the open source library, wherein the first source code entity and the second source code entity are not received with the first characteristic or the second characteristic.

2. The method of claim 1, further comprising:

determining a characteristic of an open source code entity associated with an open source project; and storing the characteristic and an identifier of the open source code entity in the repository.

3. The method of claim 2 wherein the identifier comprises a name of the open source project.

4. The method of claim 2 wherein the identifier comprises an item selected from the group consisting of: a license associated with the open source project, a vulnerability, a bug, a quality issue, a trend report, a replacement, and information related to other users that use the open source project.

5. The method of claim 1 wherein the characteristic of the first source code entity or the second source code entity to be checked is a hash value assigned to the first source code or the second source code entity, respectively.

6. The method of claim 5 wherein the hash value is obtained by performing SHA-1 hash function upon the first source code entity or the second source code entity, respectively.

7. The method of claim 1 wherein the characteristic of the first source code entity or the second source code entity to be checked is a sequence of keywords or keyword symbols extracted from the first source code entity or the second source code entity, respectively.

8. The method of claim 1 wherein the characteristic of the first source code entity or the second source code entity to be checked is a value computed based on a sequence of keywords or keyword symbols extracted from the first source code entity or the second source code entity, respectively.

9. The method of claim 1 wherein the first source code entity or the second source code entity to be checked is a file.

10. The method of claim 1 wherein the first source code entity or the second source code entity to be checked is a portion of a file.

11. The method of claim 1 wherein the first source code entity or the second source code entity to be checked comprises two portions of a file.

12. The method of claim 1 wherein the first source code entity or the second source code entity to be checked is a predetermined number of code lines extracted from a file.

13. The method of claim 1 further comprising determining the characteristic of the first source code entity or the second source code entity to be checked.

14. The method of claim 13 further comprising removing non-functional parts of the first source code entity or the second source code entity prior to determining the characteristic.

15. A system for determining open source usage, comprising:

a processor;

a communication component for receiving a first characteristic of a first source code entity to be checked and a second characteristic of a second source code entity to be checked;

a repository comprising a multiplicity of source code entity characteristics and an identifier of an open source library associated with each source code entity characteristic;

a comparison component for:

comparing the first characteristic to characteristics stored in a repository representing an open source library;

comparing the second characteristic to the characteristics stored in the repository;

based on comparing the first characteristic to the characteristics stored in the repository, determining a first probability indicating that the first source code entity contains code from the open source library;

based on comparing the second characteristic to the characteristics stored in the repository, determining a second probability lower than the first probability, wherein the second probability indicates that the second source code entity does not contain code from the open source library; and determining due to the first probability indicating that the first source code entity contains code from the open source library, that the second source code entity also contains code from the open source library; and a user interface module or communication module for providing the identifier of the open source library, wherein the first source code entity and the second source code entity are not received with the first characteristic or the second characteristic.

16. The system of claim 15, further comprising a characteristic determination component for determining the characteristic of the first source code entity or the second source code entity.

17. The system of claim 15 wherein the characteristic of the first source code entity or the second source code entity to be checked is a hash value assigned to the first source code entity or the second source code entity, respectively.

18. The system of claim 15 wherein the characteristic of the first source code entity or the second source code entity to be checked is a sequence of keywords or keyword symbols extracted from the first source code entity or the second source code entity, respectively.

19. A computer program product comprising a computer readable storage medium retaining program instructions, which program instructions when read by a processor, cause the processor to perform a method comprising:

receiving a first characteristic of a first source code entity to be checked and a second characteristic of a second source code entity to be checked;

comparing the first characteristic to characteristics stored in a repository representing an open source library;

comparing the second characteristic to the characteristics stored in the repository; and based on comparing the first characteristic to the characteristics stored in the repository, determining a first probability indicating that the first source code entity contains code from the open source library;

based on comparing the second characteristic to the characteristics stored in the repository, determining a second probability lower than the first probability, wherein the second probability indicates that the second source code entity does not contain code from the open source library;

determining due to the first probability indicating that the first source code entity contains code from the open source library, that the second source code entity also contains code from the open source library; and providing an indication of the open source library, wherein the first source code entity and the second source code entity are not received with the first characteristic or the second characteristic.

20. The method of claim 1 wherein an indication of the open source library being associated with the first characteristic is provided subject to the first probability exceeding a predetermined threshold.

21. The system of claim 15 wherein an indication of the open source library associated with the first characteristic is provided subject to the first probability exceeding a predetermined threshold.

* * * * *